United States Patent
Yeo et al.

(10) Patent No.: US 7,123,428 B2
(45) Date of Patent: Oct. 17, 2006

(54) METHOD OF SCREENING HARD DISK DRIVE

(75) Inventors: Chang-dong Yeo, Yongin-si (KR); Jong-yoon Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/934,364

(22) Filed: Sep. 7, 2004

(65) Prior Publication Data

US 2005/0052768 A1   Mar. 10, 2005

(30) Foreign Application Priority Data

Sep. 9, 2003   (KR) ..................... 10-2003-0063363

(51) Int. Cl.
*G11B 27/36* (2006.01)
(52) U.S. Cl. .......................................... 360/31; 360/69
(58) Field of Classification Search ...................... None
See application file for complete search history.

(56) References Cited

U.S. PATENT DOCUMENTS

| | | | | |
|---|---|---|---|---|
| 4,979,055 A | * | 12/1990 | Squires et al. ................. 360/69 |
| 5,459,620 A | * | 10/1995 | Tsuchiya ....................... 360/51 |
| 5,566,095 A | * | 10/1996 | Cameron et al. .............. 702/94 |
| 5,729,397 A | * | 3/1998 | Ottesen et al. ................. 360/69 |
| 6,043,943 A | * | 3/2000 | Rezzi et al. ................... 360/46 |
| 6,249,392 B1 | | 6/2001 | Sacks et al. |
| 6,249,890 B1 | * | 6/2001 | Ukani et al. ................. 714/721 |
| 6,421,197 B1 | * | 7/2002 | Abdelnour ............... 360/77.02 |
| 6,525,892 B1 | * | 2/2003 | Dunbar et al. ................ 360/31 |
| 6,587,300 B1 | * | 7/2003 | Dobbek ......................... 360/75 |
| 6,751,039 B1 | * | 6/2004 | Cheng et al. .................. 360/66 |
| 2002/0105748 A1 | | 8/2002 | Lamberts |

FOREIGN PATENT DOCUMENTS

| | | |
|---|---|---|
| JP | 9-55035 | 2/1997 |
| JP | 9-139040 | 5/1997 |
| JP | 09-180142 | 7/1997 |

OTHER PUBLICATIONS

Office Action for Application No. 10-2003-0063363, issued by the Korean Intellectual Property Office on Oct. 31, 2005.

* cited by examiner

*Primary Examiner*—Kin Wong
(74) *Attorney, Agent, or Firm*—Staas & Halsey LLP

(57) ABSTRACT

A method of screening a hard disk drive (HDD) including: measuring one or more parameters to display read/write head performances at least two times during an HDD process; and calculating variances of the measured one or more parameters and judging whether head degradation has occurred based on the calculated variances.

40 Claims, 4 Drawing Sheets

METHOD OF SCREENING HARD DISK DRIVE

CROSS-REFERENCE TO RELATED APPLICATIONS

This application claims the priority of Korean Patent Application No. 2003-63363, filed on Sep. 9, 2003, in the Korean Intellectual Property Office, the disclosure of which is incorporated herein in its entirety by reference.

BACKGROUND OF THE INVENTION

1. Field of the Invention

The present invention relates to a hard disk drive (HDD), and more particularly, to a method of screening an HDD having the possibility of head degradation during an HDD process.

2. Description of the Related Art

A hard disk drive (HDD) is a device that reads and/or writes data from and/or to a disk using a magnetic head. The disk is rotatably mounted on a spindle motor, and information is accessed by the magnetic head, namely, read/write head, mounted on an actuator arm that is rotated by a voice coil motor. The voice coil motor is excited by a current to rotate an actuator and move the read/write head. The read/write head detects a magnetic change occurring on a surface of the disk and reads the information recorded on the surface of the disk. To write information on a data track, current is supplied to the read/write head. The current creates a magnetic field, thereby magnetizing the surface of the disk.

As capacity of an HDD has increased recently, the size of a read/write sensor of a magnetic head has been reduced, and flying height (FH) has also been reduced. Such design of the HDD results in an increase in the possibility of head degradation during an HDD operation. The head degradation directly affects the reliability of the HDD.

After the HDD is assembled, a process of verifying and optimizing various parameters is performed. The process is referred to as the HDD process.

The head degradation is judged in a specific operation of a procedure for verifying the HDD. For example, instability of the magnetic head is checked in an adaptive read channel optimizing (ARCO) operation, which is performed in an early stage of the procedure.

In the conventional art, the instability of the magnetic head is checked using a thermal asperity detection (TAD) function or by examining changes of read parameters in the ARCO operation after a writing operation.

But since the head degradation may occur in any operation during the HDD process due to electrical and/or mechanical stress, the possibility of head degradation may not be determined using only the verification in the specific operation, when a final step of the HDD process finishes.

Particularly, when HDD sets, which have marginally passed process criteria even though performances of their heads have been changed during the HDD process, are put on the market, there is always the possibility of a poorly functioning HDD.

But with the conventional art, it is hard to detect the HDD with the possibility of head degradation in advance, for example, during the HDD process, thereby making it difficult to prevent a poorly functioning HDD.

SUMMARY OF THE INVENTION

The present invention provides a method of effectively screening a hard disk drive (HDD) with head degradation or the possibility of head degradation during an HDD process.

According to an aspect of the present invention, there is provided a method of screening an HDD, the method comprising: measuring one or more parameters to display read/write head performances at least two times during an HDD process; and calculating variances of the measured one or more parameters and judging whether head degradation has occurred based on the calculated variances.

According to one aspect, the operation of measuring the one or more parameters to display the read/write head performances is respectively performed at least one time right after a start of the HDD process, in a middle of the HDD process, and right before an end of the HDD process.

According to one aspect, the HDD process includes an operation of optimizing performance characteristics of the HDD and an operation of verifying read/write performances.

According to one aspect, the operation of optimizing the performance characteristics of the HDD includes at least one of a servo calibrating operation, a channel optimizing operation, and a printed circuit board assembly (PCBA) checking operation.

According to one aspect, the operation of measuring the one or more parameters to display the read/write head performances is performed at least one time in the operation of optimizing the performance characteristics of the HDD.

According to one aspect, the operation of measuring the one or more parameters to display the read/write head performances is performed at least one time in the operation of verifying the read/write performances.

According to one aspect, the one or more parameters to display the read/write head performances include an adaptive gain control (AGC) and an asymmetry control (ASC).

According to one aspect, the head degradation is judged based on variances of the adaptive gain control and the asymmetry control.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
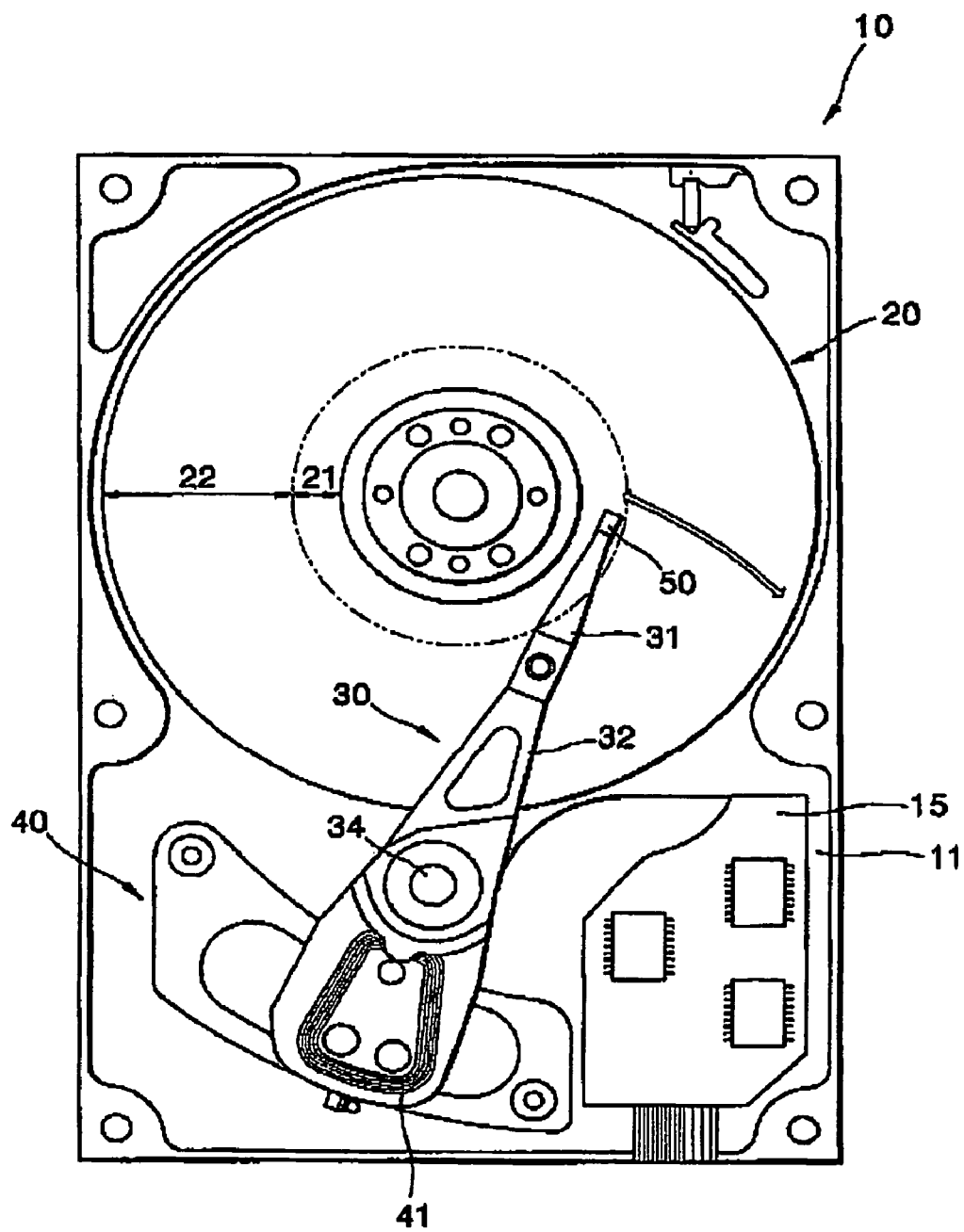
FIG. 1 is a schematic plan view illustrating primary elements of a hard disk drive (HDD)

Reference will now be made in detail to the embodiments of the present invention, examples of which are illustrated in the accompanying drawings, wherein like reference numerals refer to the like elements throughout. The embodiments are described to explain the present invention by referring to the figures.

A hard disk drive (HDD) 10 is provided with one or more magnetic heads corresponding to read/write surfaces of rotating disks. A magnetic head writes and/or reads information by magnetizing and/or detecting a magnetic field on a surface of a rotating disk.

Read/write functions in the HDD 10 are performed by driving a swing arm to move the magnetic head installed on a distal end of the swing arm to a proper position on the rotating disk using a rotational force of a magnetic head assembly, which is rotatably installed on a base.

FIG. 1 is a schematic plan view illustrating an embodiment of the HDD 10. Referring to FIG. 1, the HDD 10 includes a hard disk 20, on which information is recorded, and a magnetic head moving unit, which moves a magnetic head slider 50 to a desired track on the hard disk 20 to write and read information. According to one embodiment, the hard disk 20 has a recording area 22 on which the information is recorded, and a parking area 21, on which the magnetic head slider 50 is parked when the hard disk 20 stops rotating.

The hard disk 20 is rotatably installed on a base 11, and is rotated by a spindle motor (not shown).

The magnetic head moving unit includes a magnetic head assembly 30 on which the magnetic head slider 50 is mounted, the magnetic head assembly being rotatably installed about a rotating shaft 34 disposed on the base 11, and an actuator 40, which rotates the magnetic head assembly 30 using an electromagnetic force.

The magnetic head assembly 30 includes the shaft 34, a suspension 31, which is installed on an end of an actuator arm 32 that is rotatably coupled to the shaft 34, and the magnetic head slider 50, which is installed on the suspension 31, and has a magnetic head 70 (shown in FIG. 2), which writes and/or reads information to and/or from the hard disk 20.

The magnetic head slider 50 is biased toward the hard disk 20 by the suspension 31. When the hard disk 20 begins to rotate, the magnetic head slider 50 flies over the hard disk 20 due to an aerodynamic pressure generated by the rotation of the hard disk 20. A flying height (FH) at which the magnetic head slider 50 flies is determined by a gram load of the suspension 31 and a lift force produced due to air flow during the rotation of the hard disk 20.

In other words, when the magnetic head slider 50 flies over the hard disk 20 during the rotation of the hard disk 20, a gap between a surface of the hard disk 20 and a read sensor, i.e., a magneto-resistive (MR) head, disposed on a leading end of the magnetic head slider 50, is referred to as the FH. A force exerted by the suspension 31 is referred to as the gram load.

Figure 2:
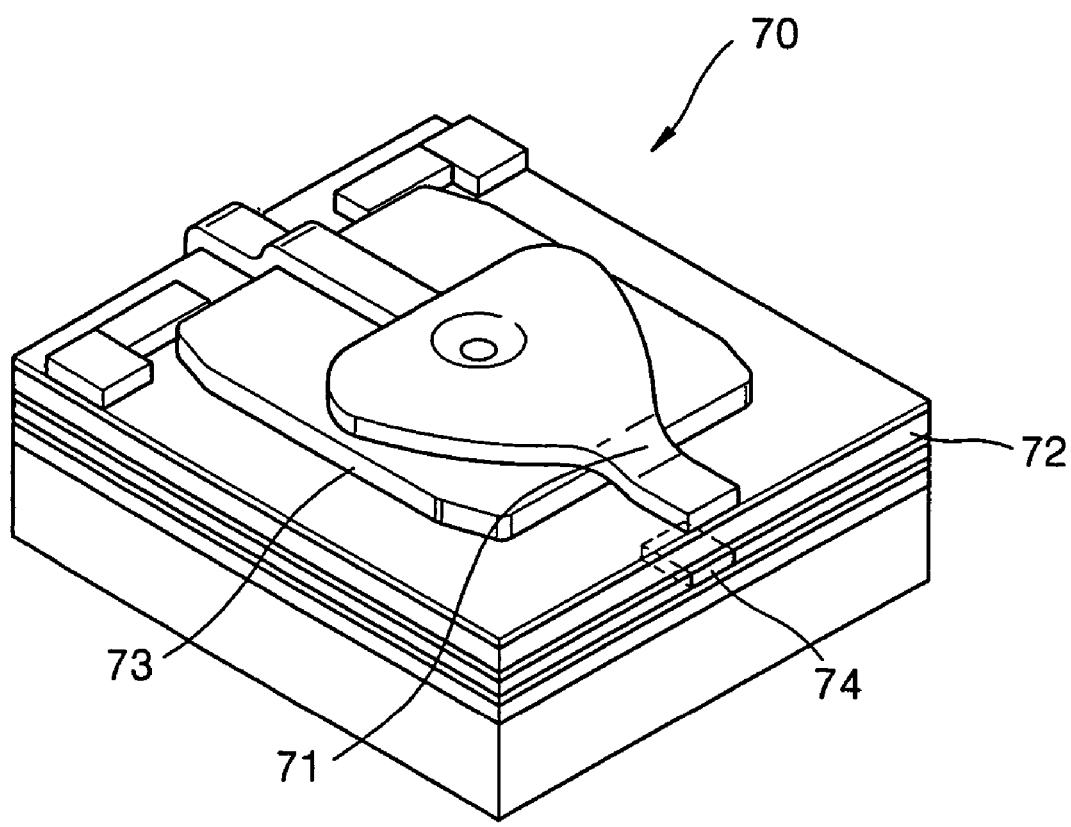
FIG. 2 is a schematic perspective view of a magnetic head of the HDD shown in FIG. 1.

FIG. 2 is a schematic perspective view illustrating an embodiment of the magnetic head 70 of the HDD 10 of FIG. 1. Referring to FIG. 2, the magnetic head 70 includes an MR head 74 to read data, and an inductive write head to write data. The MR head 74 senses and reads a magnetic signal written on the hard disk 20. The inductive write head includes a top pole 71 and a bottom pole 72, which form magnetic flux leaking to the hard disk 20, and a write coil 73, which creates a magnetic field when current is supplied. The inductive write head writes a desired magnetic signal to the hard disk 20.

Referring again to FIG. 1, the actuator 40 includes a magnet (not shown) and a voice coil 41, which are well known. If current is applied to the voice coil 41, the actuator 40 moves the magnetic head 70 to a desired track on the hard disk 20.

The spindle motor, the voice coil 41, and the magnetic head 70 are electrically connected to an electronic circuit of a printed circuit board assembly (PCBA) 15.

After the HDD described above is assembled, a process of verifying and optimizing the HDD is performed.

A method of screening the HDD according to an embodiment of the present invention is performed during an HDD process, or is partly performed during the HDD process, and then partly performed after the HDD process finishes.

Figure 3:
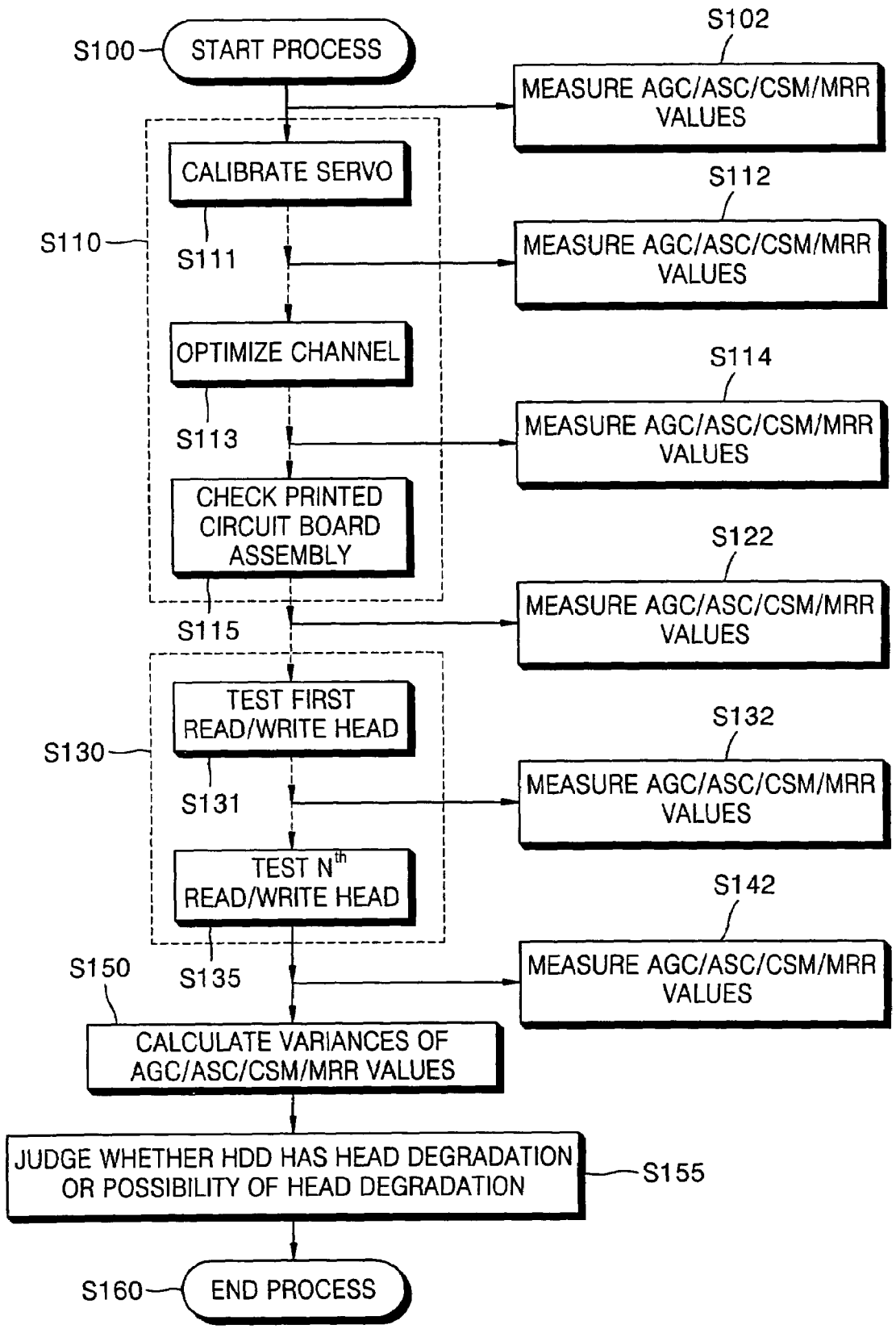
FIG. 3 is a flow chart illustrating an embodiment of an HDD process to which a method of screening an HDD according to the present invention is applied.
Figure 4:
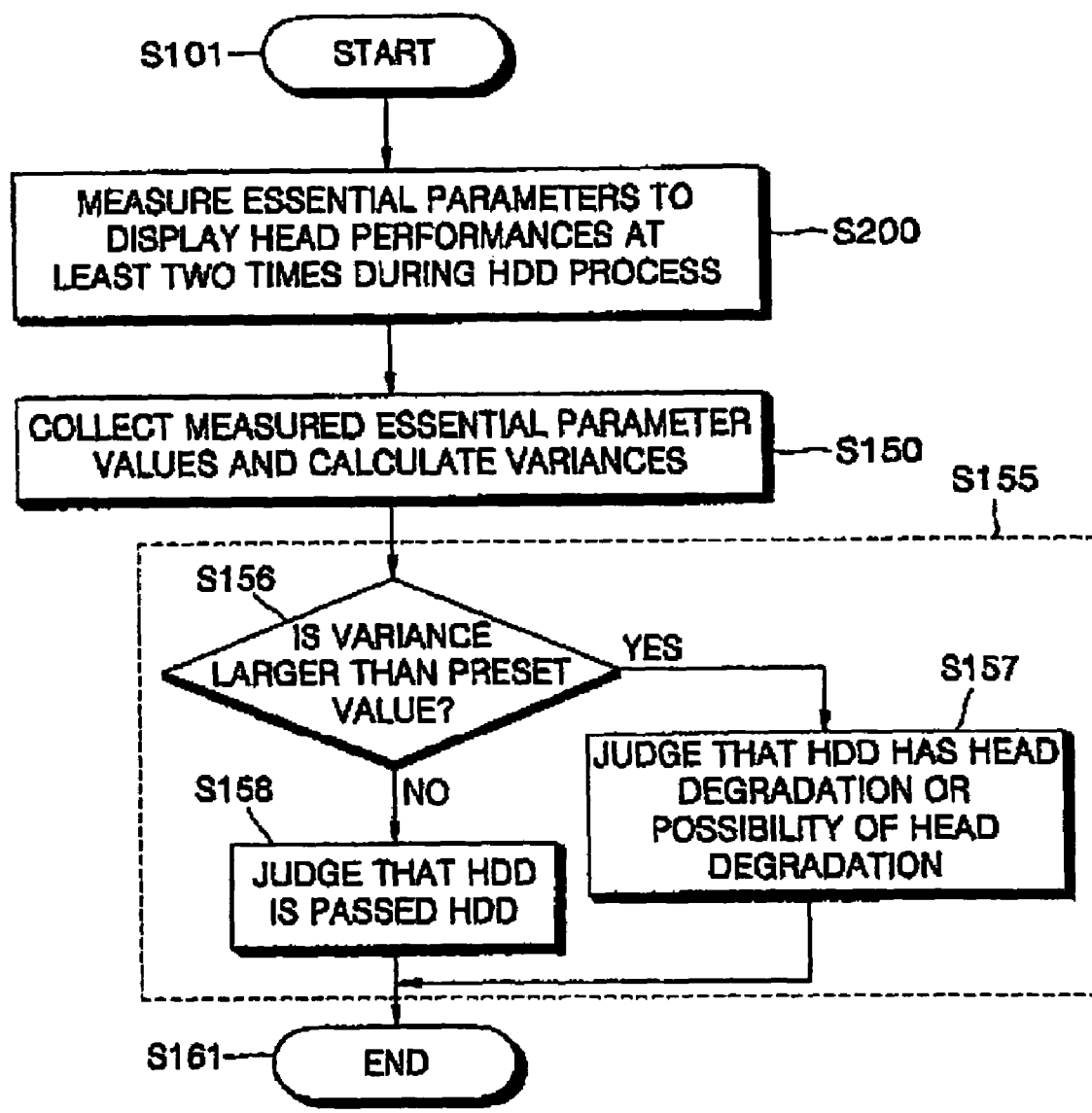
FIG. 4 is a flow chart illustrating an embodiment of the method of screening the HDD.

FIG. 3 is a flow chart illustrating an embodiment of the HDD process to which the method of screening the HDD according to the present invention is applied, and FIG. 4 is a flow chart illustrating an embodiment of the method of screening the HDD.

Referring to FIG. 3, performance characteristics of the assembled HDD are optimized in operation S110, and read/write performances are verified in operation S130. FIG. 3 illustrates essential operations of the HDD process. The HDD process may include operations other than those illustrated in FIG. 3, and each operation of FIG. 3 may also include sub-operations.

For example, the operation S110 of optimizing the performance characteristics of the HDD includes various calibrating and parameter optimizing operations, which include at least one of operation S111 where a servo is calibrated, operation S113 where a channel is optimized, and operation S115 where the PCBA 15 is checked.

In the servo calibrating operation S111, parameters to mechanically and electrically control a position of a read/write head, namely, the MR head 74, are optimized. Here, the parameters to be optimized include an MR head skew, a KT value, and so on. The KT value represents a magnitude of acceleration of the MR head 74 according to a rotational force of the MR head 74.

In the channel optimizing operation S113, read/write parameters to perform normal read/write functions by the MR head 74 are optimized. For example, the read/write parameters include read current and write current.

In the PCBA checking operation S115, whether the PCBA 15 can perform mechanical/electrical functions is determined, and whether a circuit system functions correctly is checked. A plurality of circuits including a read/write integrated circuit (RW IC) performing read/write functions, a controller, a combo IC controlling a motor, and so on, are installed on a printed circuit board of the PCBA 15.

The operation S110 of optimizing the performance characteristics of the HDD includes various mechanical/electrical calibrating operations for various parts constituting the HDD and various parameter optimizing operations.

A plurality of magnetic heads corresponding to read/write surfaces of hard disks is disposed within the HDD. The operation S130 of verifying the read/write performances is performed on the respective magnetic heads. For example, if "N" number of magnetic heads are disposed within the HDD, the verifying operation ranges from operation S131, where read/write performances of a first read/write head are tested, to operation S135 where read/write performances of an "N"[th] read/write head are tested. The read/write performances of the respective magnetic heads are verified through the read/write performance tests.

The verification of the read/write performances is carried out by reading an off-track, changing various write patterns, and so on.

Head degradation may occur in any operations of the HDD process.

Accordingly, the method of screening the HDD according to the present invention, as is shown in FIGS. 3 and 4, measures parameters to display head performances in operation S102 right after operation S100, where the HDD process starts, in at least two operations of S112, S114, S122, and S132 in a middle of the HDD process, and in operation S142 right before operation S160, where the HDD process ends, and judges whether head degradation has occurred based on the measured parameter values.

In operation S200 (FIG. 4), the essential parameters to display the head performances are measured at least two times during the HDD process.

To judge whether head degradation has occurred, the measured parameters include at least some of an adaptive gain control (AGC) value, an asymmetry control (ASC) value, a channel statistics measurement (CSM) value, and an MR resistance (MRR) value.

The AGC is a parameter to adjust an amplitude, and refers to a gain value when a channel is out. In an AGC adjustment, a gain is adjusted in consideration of sensitivities of the respective heads, so that all heads provide the same outputs.

The ASC is a parameter to adjust asymmetry, and indicates a change in asymmetry of the head. The asymmetry control is performed to adjust an offset of a zero base line.

The CSM represents the number of broken bits read during a reading operation after a writing operation, and through which a bit error rate (BER) can be indirectly obtained.

According to one embodiment, it is preferable that variances of the AGC value and the ASC value, among the parameters to display the head performances, are used as criteria in deciding whether head degradation has occurred.

While all of the AGC value, the ASC value, the CSM value, and the MMR value are measured in the embodiment depicted in FIG. 3, according to one embodiment, some of them, for example, only the AGC value and the ASC value, are measured.

As is described above, according to an embodiment of the present invention, the essential parameters to display the head performances are measured at least two times during process of the HDD in operation S200, including measurements in operation S102 right after the HDD process starting operation S100 and in operation S142 right before the HDD process ending operation S160.

In operation S150 (FIGS. 3 and 4), the measured essential parameter values are collected and variances of the measured values are calculated. Whether the HDD has head degradation or the possibility of head degradation is judged based on the calculated variances.

FIG. 3 exemplarily shows that the essential parameters to display the head performances are measured in operation S102 right after the process starting operation S100, in operation S112 during the servo calibrating operation S111, in operation S114 during the channel optimizing operation S113, in operation S122 during the PCBA checking operation S115, in operation S132 during the read/write head verifying operation, and in operation S142 right before the process ending operation S160.

The number of times and operations in which the essential parameters for displaying the head performances are measured is not restricted to the embodiment of FIG. 3 but may be modified.

Referring to FIG. 4, after the measuring data of the essential parameters to display the head performances, which has been measured in the above several operations of the HDD process, is collected, the variances of the essential parameters are calculated in operation S150. In operation S155, it is judged whether there exists a head having variances of the primary elements. More specifically, in operation S156, it is determined whether variances in the AGC value and the ASC value are larger than respective preset values. If so, the HDD is judged to have head degradation or the possibility (or increased likelihood) of head degradation in operation S157.

If the variances of the measured essential parameter values are less than the respective preset values, the HDD is judged to be a normal HDD without head degradation in operation S158, and the qualifying HDD can be put onto the market. The method ends at operation S161.

As is shown in FIG. 3, the operation S155 of judging whether the HDD has head degradation or the possibility of head degradation is performed right before the HDD process finishes. Alternatively, according to another embodiment, only the operation of measuring the essential parameters to display the head performances is performed during the HDD process, and the operations of collecting the measured essential parameter values and judging whether the HDD has head degradation or the possibility of head degradation are performed after the HDD process finishes.

Here, a preset value for the AGC value is a value right before the read performance begins to change. When the AGC value exceeds the preset value, the read performance of the head begins to change.

A preset value for the ASC value is an absolute value right before the read performance begins to change, when the ASC varies into an opposite sign. When the ASC varies into an opposite sign and the absolute value exceeds the preset value, the read performance begins to change.

According to one embodiment, preset variance values for the AGC value and the ASC value, which are criteria in deciding the existence of head degradation, range from about 20% to 30%.

Embodiments of present invention, as described above, can effectively sort out not only an HDD with head degradation but also an HDD with the possibility of head degradation, before the HDD process has finally finished.

Accordingly, the method of screening the HDD according to an embodiment of the present invention can screen in advance an HDD with the possibility of head degradation, thereby considerably reducing a rate of poorly functioning HDDs on the market.

It is understood that an embodiment of the present invention may be used and/or controlled by a machine-readable medium on which is stored a set of instructions (i.e., software) embodying any one, or all, of the embodiments described herein. The machine-readable medium may include permanent or removable storage, such as magnetic and optical discs, RAM, ROM, a carrier wave medium, etc., on which the process and data structures of the present invention can be stored and distributed. The operations can also be distributed via, for example, downloading over a network such as the Internet.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of screening a hard disk drive for placement onto a market, the method comprising:

measuring one or more parameters to display read/write head performances at least two times during a hard disk drive process;

calculating variances of the measured one or more parameters and judging whether head degradation has occurred based on the calculated variances, wherein the measuring of the one or more parameters and the calculating of the variances occur subsequent to assembly of the hard disk drive; and determining whether the hard disk drive is qualified to be placed onto the market based on whether head degradation has occurred.

2. The method of claim 1, wherein the operation of measuring the one or more parameters to display the read/write head performances is respectively performed at least one time right after a start of the hard disk drive process, in a middle of the hard disk drive process, and right before an end of the hard disk drive process.

3. The method of claim 2, wherein the one or more parameters to display the read/write head performances includes an adaptive gain control and an asymmetry control.

4. The method of claim 3, wherein the head degradation is judged based on variances of the adaptive gain control and the asymmetry control.

5. The method of claim 1, wherein the one or more parameters to display the read/write head performances includes an adaptive gain control and an asymmetry control.

6. The method of claim 5, wherein the head degradation is judged based on variances of the adaptive gain control and the asymmetry control.

7. The method of claim 1, wherein the hard disk drive is determined to be qualified to be placed onto the market when the calculated variances are less than preset values, which indicates that there is no head degradation.

8. The method of claim 1, wherein the hard disk drive is determined not to be qualified to be placed onto the market when the calculated variances are larger than preset values, which indicates that the head has degraded or has the increased likelihood of degradation.

9. A method of screening a hard disk drive for placement onto a market, the method comprising:

measuring one or more parameters to display read/write head performances at least two times during a hard disk drive process;

calculating variances of the measured one or more parameters and judging whether head degradation has occurred based on the calculated variances, and determining whether the hard disk drive is qualified to be placed onto the market based on whether head degradation has occurred, wherein the hard disk drive process includes an operation of optimizing performance characteristics of the hard disk drive and an operation of verifying read/write performances.

10. The method of claim 9, wherein the operation of optimizing the performance characteristics of the hard disk drive includes at least one of a servo calibrating operation, a channel optimizing operation, or a printed circuit board assembly checking operation.

11. The method of claim 9, wherein the operation of measuring the one or more parameters to display the read/write head performances is performed at least one time in the operation of optimizing the performance characteristics of the hard disk drive.

12. The method of claim 11, wherein the one or more parameters to display the read/write head performances includes an adaptive gain control and an asymmetry control.

13. The method of claim 12, wherein the head degradation is judged based on variances of the adaptive gain control and the asymmetry control.

14. The method of claim 9, wherein the operation of measuring the one, or more parameters to display the head read/write performances is performed at least one time in the operation of verifying the read/write performances.

15. The method of claim 14, wherein the one or more parameters to display the read/write head performances includes an adaptive gain control and an asymmetry control.

16. The method of claim 15, wherein the head degradation is judged based on variances of the adaptive gain control and the asymmetry control.

17. The method of claim 9, wherein the hard disk drive is determined to be qualified to be placed onto the market when the calculated variances are less than preset values, which indicates that there is no head degradation.

18. The method of claim 3, wherein the hard disk drive is determined to be qualified to be placed onto the market when the calculated variances are larger than preset values, which indicates that the head has degraded or has the increased likelihood of degradation.

19. A method of screening a hard disk drive for placement onto a market, the method comprising:

measuring head performance parameters at least twice during a hard disk drive process;

collecting the measured head performance parameters;

determining a variance of respective measured head performance parameters, and determining that a head of the hard disk drive has degraded, or the head of the hard disk drive has an increased likelihood of degradation, using the respective variances, wherein the measuring of the head performance parameters, and the collecting of the measured head performance parameters, and the determining of the respective variances occur subsequent to assembly of the hard disk drive; and determining whether the hard disk drive is qualified to be placed onto the market based on whether the head has degraded or the head has an increased likelihood of degradation.

20. The method according to claim 19, wherein the measured head performance parameters comprises:

an adaptive gain control; and an asymmetry control.

21. The method according to claim 19, wherein the measuring the head performance parameters at least twice during the hard disk drive process comprises:

measuring the head performance parameters as a first operation of the hard disk drive process.

22. The method according to claim 19, wherein the determining the variance of the respective measured head performance parameters is performed as a final operation in the hard disk drive process.

23. The method according to claim 19, wherein only the measuring head performance parameters operation is performed during the hard disk drive process.

24. The method of claim 19, wherein the hard disk drive is determined to be qualified to be placed onto the market when the calculated variances are less than preset values, which indicates that there is no head degradation.

25. The method of claim 19, wherein the hard disk drive is determined to be qualified to be placed onto the market when the calculated variances are larger than preset values, which indicates that the head has degraded or has the increased likelihood of degradation.

26. A method of screening a hard disk drive for placement onto a market, the method comprising:
  measuring head performance parameters at least twice during a hard disk drive process;
  collecting the measured head performance parameters;
  determining a variance of respective measured head performance parameters, and determining that a head of the hard disk drive degraded, or the head of the hard disk drive has an increased likelihood of degradation, using the respective variances; and
  determining whether the hard disk drive is qualified to be placed onto the market based on whether the head has degraded or the head has an increased likelihood of degradation,
  wherein the measuring the head performance parameters at least twice during the hard disk drive process comprises:
    measuring the head performance parameters as a first operation of the hard disk drive process,
    measuring the head performance parameters subsequent to an optimizing performance characteristics of the hard disk drive operation and prior to a verifying a read/write performance operation, and
    measuring the head performance parameters subsequent to the verifying the read/write performance operation.

27. The method according to claim 26, wherein the optimizing performance characteristics of the hard disk drive operation comprises:
  calibrating a servo;
  optimizing a channel; and
  checking a printed circuit board assembly.

28. The method according to claim 27, wherein the calibrating the servo comprises:
  optimizing parameters to electrically and mechanically control a read/write head position.

29. The method according to claim 28, wherein the optimizing the parameters to electrically and mechanically control the read/write head position comprises:
  optimizing an MR head skew; and
  optimizing a KT value, where the KT value represents a magnitude of acceleration of the MR head according to a rotational force of the MR head.

30. The method according to claim 27, wherein the optimizing the channel comprises:
  optimizing a read current; and
  optimizing a write current.

31. The method according to claim 27, wherein the checking the printed circuit board assembly comprises:
  determining whether the printed circuit board assembly can perform required mechanical/electrical functions; and
  determining whether a circuit system functions correctly.

32. The method according to claim 27, wherein the measuring the head performance parameters at least twice during the hard disk drive process further comprises:
  measuring the head performance parameters subsequent to the calibrating the servo; and;
  measuring the head performance parameters subsequent to the optimizing the channel.

33. The method according to claim 26, wherein the read/write performance operation comprises:
  verifying a read/write performance of each magnetic head.

34. The method according to claim 33, wherein the measuring the head performance parameters at least twice during the hard disk drive process further comprises:
  measuring the head performance parameters subsequent to the verifying the read/write performance of each magnetic head.

35. The method of claim 26, wherein the hard disk drive is determined to be qualified to be placed onto the market when the calculated variances are less than preset values, which indicates that there is no head degradation.

36. The method of claim 26, wherein the hard disk drive is determined to be qualified to be placed onto the market when the calculated variances are larger than preset values, which indicates that the head has degraded or has the increased likelihood of degradation.

37. A method of screening a hard disk drive, the method comprising:
  measuring head performance parameters at least twice during a hard disk drive process;
  collecting the measured head performance parameters; and
  determining a variance of respective measured head performance parameters, and determining that a head of the hard disk drive has degraded, or the head of the hard disk drive has an increased likelihood of degradation, using the respective variances,
  wherein the measuring of the head performance parameters, and the collecting of the measured head performance parameters, and the determining of the respective variances occur subsequent to assembly of the hard disk drive,
  wherein the measured head performance parameters comprises:
  an adaptive gain control; and
  an asymmetry control, and
  wherein variance values for the adaptive gain control and the asymmetry control respectively range from about 20% to about 30%.

38. A computer readable medium encoded with processing instructions for implementing a method of screening a hard disk drive subsequent to assembly thereof for placement onto a market, performed by a computer, the method comprising:
  a first set of instructions to measure head performance parameters at least twice during a hard disk drive process;
  a second set of instructions to collect the measured head performance parameters;
  a third set of instructions to determine, subsequent to assembly of the hard disk drive, variances of respective measured head performance parameters, and determine that a head of the hard disk drive one of has degraded, and has an increased likelihood of degradation, using the respective variances, and
  a fourth set of instructions to determine whether the hard disk drive is qualified to be placed onto the market based on the determination of whether the head of the hard disk drive has degraded or has an increased likelihood of degradation.

39. The medium of claim 38, wherein the hard disk drive is determined to be qualified to be placed onto the market when the calculated variances are less than preset values, which indicates that there is no head degradation.

40. The medium of claim 38, wherein the hard disk drive is determined to be qualified to be placed onto the market when the calculated variances are larger than preset values, which indicates that the head has degraded or has the increased likelihood of degradation.

* * * * *

UNITED STATES PATENT AND TRADEMARK OFFICE
CERTIFICATE OF CORRECTION

PATENT NO. : 7,123,428 B2
APPLICATION NO. : 10/934364
DATED : October 17, 2006
INVENTOR(S) : Chang-dong Yeo et al.

It is certified that error appears in the above-identified patent and that said Letters Patent is hereby corrected as shown below:

Column 8, Line 5, change "one," to --one--.

Column 8, Line 18, change "claim 3," to --claim 9,--.

Column 9, Line 8, after "drive" insert --has--.

Signed and Sealed this

Twenty-fourth Day of April, 2007

JON W. DUDAS
*Director of the United States Patent and Trademark Office*